United States Patent
Mittal et al.

(10) Patent No.: US 11,087,469 B2
(45) Date of Patent: Aug. 10, 2021

(54) METHOD, APPARATUS, AND SYSTEM FOR CONSTRUCTING A POLYLINE FROM LINE SEGMENTS

(71) Applicant: HERE GLOBAL B.V., Eindhoven (NL)

(72) Inventors: Anish Mittal, Berkeley, CA (US); David Lawlor, Chicago, IL (US); Zhanwei Chen, Oakland, CA (US); Himaanshu Gupta, San Francisco, CA (US)

(73) Assignee: HERE Global B.V., Eindhoven (NL)

( * ) Notice: Subject to any disclaimer, the term of this patent is extended or adjusted under 35 U.S.C. 154(b) by 88 days.

(21) Appl. No.: 16/034,190

(22) Filed: Jul. 12, 2018

(65) Prior Publication Data
US 2020/0020104 A1   Jan. 16, 2020

(51) Int. Cl.
*G06T 7/181* (2017.01)
*G06T 7/13* (2017.01)
*G06K 9/00* (2006.01)

(52) U.S. Cl.
CPC ............ *G06T 7/13* (2017.01); *G06K 9/00798* (2013.01); *G06K 9/00805* (2013.01); *G06T 7/181* (2017.01)

(58) Field of Classification Search
CPC ........... G06K 9/00798; G06K 9/00805; G06K 9/4638; G06T 7/13; G06T 7/181
See application file for complete search history.

(56) References Cited

U.S. PATENT DOCUMENTS

| 5,598,216 A | * | 1/1997 | Lee | H04N 19/54 375/240.16 |
| 6,144,409 A | * | 11/2000 | Han | G06T 9/20 348/426.1 |
| 6,259,802 B1 | * | 7/2001 | Jolly | G06K 9/3216 382/103 |

(Continued)

FOREIGN PATENT DOCUMENTS

| EP | 0 434 455 A2 | 6/1991 | |
| EP | 0434455 A2 | * 6/1991 | ........... G06K 9/4638 |

(Continued)

OTHER PUBLICATIONS

Amigoni et al., "Building Segment-Based Maps Without Pose Information", Proceedings of the IEEE, vol. 94, No. 7, Jul. 2006, pp. 1340-1359 (Year: 2006).*

(Continued)

*Primary Examiner* — Ian L Lemieux
(74) *Attorney, Agent, or Firm* — Ditthavong, Steiner & Mlotkowski

(57) ABSTRACT

An approach is provided for generating a polyline from line segments (e.g., line segments representing objects detected by a computer vision system). The approach involves selecting a line segment from a plurality of line segments. The approach also involves determining a neighboring line segment from among the plurality of line segments. The determined neighboring line segment has a closest distance to the line segment from among the plurality of line segments. The approach further involves merging the line segment and the neighboring line segment into a polyline based on determining that the closest distance is a mutual closest distance between line segment and the neighboring line segment.

27 Claims, 12 Drawing Sheets

(56) References Cited

U.S. PATENT DOCUMENTS

| | | | | |
|---|---|---|---|---|
| 6,622,085 | B1* | 9/2003 | Amita | G06T 17/05 340/995.14 |
| 7,184,592 | B2* | 2/2007 | Iga | G06F 3/0488 345/179 |
| 8,332,247 | B1* | 12/2012 | Bailey | G06Q 10/047 705/7.11 |
| 8,705,893 | B1 | 4/2014 | Zhang et al. | |
| 9,613,443 | B2 | 4/2017 | Brand et al. | |
| 9,633,436 | B2 | 4/2017 | Pisipati et al. | |
| 2004/0091883 | A1* | 5/2004 | Kimura | C07K 1/00 435/6.14 |
| 2004/0114805 | A1* | 6/2004 | Bovyrin | G06T 7/181 382/199 |
| 2006/0050959 | A1* | 3/2006 | Grady | G06T 7/12 382/173 |
| 2006/0285763 | A1* | 12/2006 | Ashikaga | G06K 9/346 382/254 |
| 2007/0286493 | A1* | 12/2007 | Liu | G06K 9/481 382/203 |
| 2010/0171999 | A1* | 7/2010 | Namikata | H04N 1/32101 358/530 |
| 2014/0095062 | A1* | 4/2014 | Wang | G01C 21/32 701/409 |
| 2014/0125666 | A1 | 5/2014 | Noh et al. | |
| 2015/0131903 | A1* | 5/2015 | Kato | G06T 5/00 382/165 |
| 2017/0076492 | A1* | 3/2017 | Nguyen | G06T 17/05 |
| 2018/0188059 | A1* | 7/2018 | Wheeler | G01C 21/3635 |
| 2018/0188090 | A1 | 7/2018 | Gervais et al. | |
| 2018/0189578 | A1* | 7/2018 | Yang | G06K 9/4638 |
| 2020/0011690 | A1* | 1/2020 | Becker | G01C 21/3679 |
| 2020/0049512 | A1* | 2/2020 | Milici | G01C 21/32 |
| 2020/0320332 | A1* | 10/2020 | Wee | G06K 9/325 |
| 2020/0356800 | A1* | 11/2020 | Zhu | G06K 9/4638 |
| 2021/0072757 | A1* | 3/2021 | Shapira | B60W 30/18072 |

FOREIGN PATENT DOCUMENTS

| | | | | |
|---|---|---|---|---|
| KR | 20180002989 | * | 1/2018 | G06K 9/4638 |
| KR | 20180002989 A | | 1/2018 | |

OTHER PUBLICATIONS

Masehian et al., "An Adaptive Sequential Clustering Algorithm for Generating Poly-line Maps From Range Data Scan in Mobile Robot Exploration", Mar. 8, 2009, 6 pages.

Silva Cardoso, "Computer Aided Recognition of Man-made Structures in Aerial Photographs", Naval Postgraduate School, Dec. 1999, retrieved on May 17, 2018 from http://faculty.nps.edu/ncrowe/oldstudents/cardosothesis.htm, 148 pages.

Office Action for related European Patent Application No. 19186039.4-1207, dated Dec. 11, 2019, 9 pages.

Amigoni et al., "Building Segment-Based Maps Without Pose Information", Proceedings of the IEEE, vol. 94, No. 7, Jul. 2006, pp. 1340-1359.

Hangouet et al., "Computation of the Hausdorff Distance Between Plane Vector Polylines", Jul. 25, 2008, pp. 1-10.

Office Action for related European Patent Application No. 19 186 039.4-1207, dated Mar. 18, 2021, 4 pages.

* cited by examiner

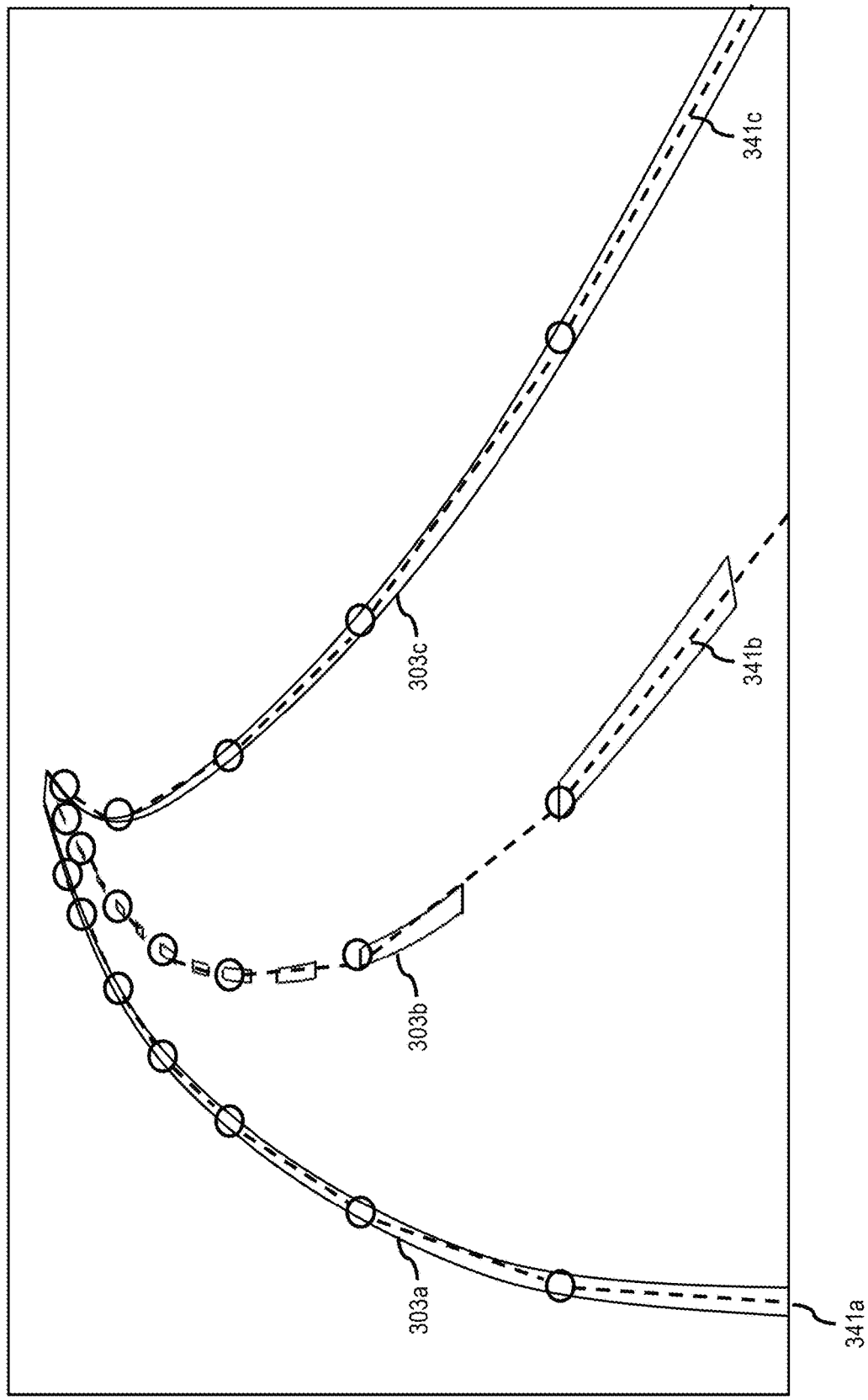

METHOD, APPARATUS, AND SYSTEM FOR CONSTRUCTING A POLYLINE FROM LINE SEGMENTS

BACKGROUND

One area of interest is the use of computer vision to enable object detection and recognition. Traditional computer vision systems often recognize objects from image data by detecting edges using image analysis. Such edges, however, are often detected as broken line segments. Accordingly, computer vision providers and other related service providers face significant technical challenges when combining the broken line segments to create coherent models of the detected objects.

SOME EXAMPLE EMBODIMENTS

Therefore, there is a need for an approach for constructing a polyline from line segments, e.g., to represent features or objects detected from image analysis.

According to one embodiment, a method comprises selecting a line segment from a plurality of line segments. The method also comprises determining a neighboring line segment from among the plurality of line segments. For example, the neighboring line segment is selected so that it has a closest distance to the line segment from among the plurality of line segments. The method further comprises merging the line segment and the neighboring line segment into a polyline based on determining that the closest distance is a mutual closest distance between line segment and the neighboring line segment.

According to another embodiment, an apparatus comprises at least one processor, and at least one memory including computer program code for one or more computer programs, the at least one memory and the computer program code configured to, with the at least one processor, cause, at least in part, the apparatus to select a line segment from a plurality of line segments. The apparatus is also caused to determine a neighboring line segment from among the plurality of line segments. For example, the neighboring line segment is selected so that it has a closest distance to the line segment from among the plurality of line segments. The apparatus is further caused to merge the line segment and the neighboring line segment into a polyline based on determining that the closest distance is a mutual closest distance between line segment and the neighboring line segment.

According to another embodiment, a non-transitory computer-readable storage medium carries one or more sequences of one or more instructions which, when executed by one or more processors, cause, at least in part, an apparatus to select a line segment from a plurality of line segments. The apparatus is also caused to determine a neighboring line segment from among the plurality of line segments. For example, the neighboring line segment is selected so that it has a closest distance to the line segment from among the plurality of line segments. The apparatus is further caused to merge the line segment and the neighboring line segment into a polyline based on determining that the closest distance is a mutual closest distance between line segment and the neighboring line segment.

According to another embodiment, an apparatus comprises means for selecting a line segment from a plurality of line segments. The apparatus also comprises means for determining a neighboring line segment from among the plurality of line segments. For example, the neighboring line segment is selected so that it has a closest distance to the line segment from among the plurality of line segments. The apparatus further comprises means for merging the line segment and the neighboring line segment into a polyline based on determining that the closest distance is a mutual closest distance between line segment and the neighboring line segment.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3C is a diagram of polylines constructed from the line segments of FIG. 3B, according to one embodiment;

DESCRIPTION OF SOME EMBODIMENTS

Examples of a method, apparatus, and computer program for constructing a polyline from line segments are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
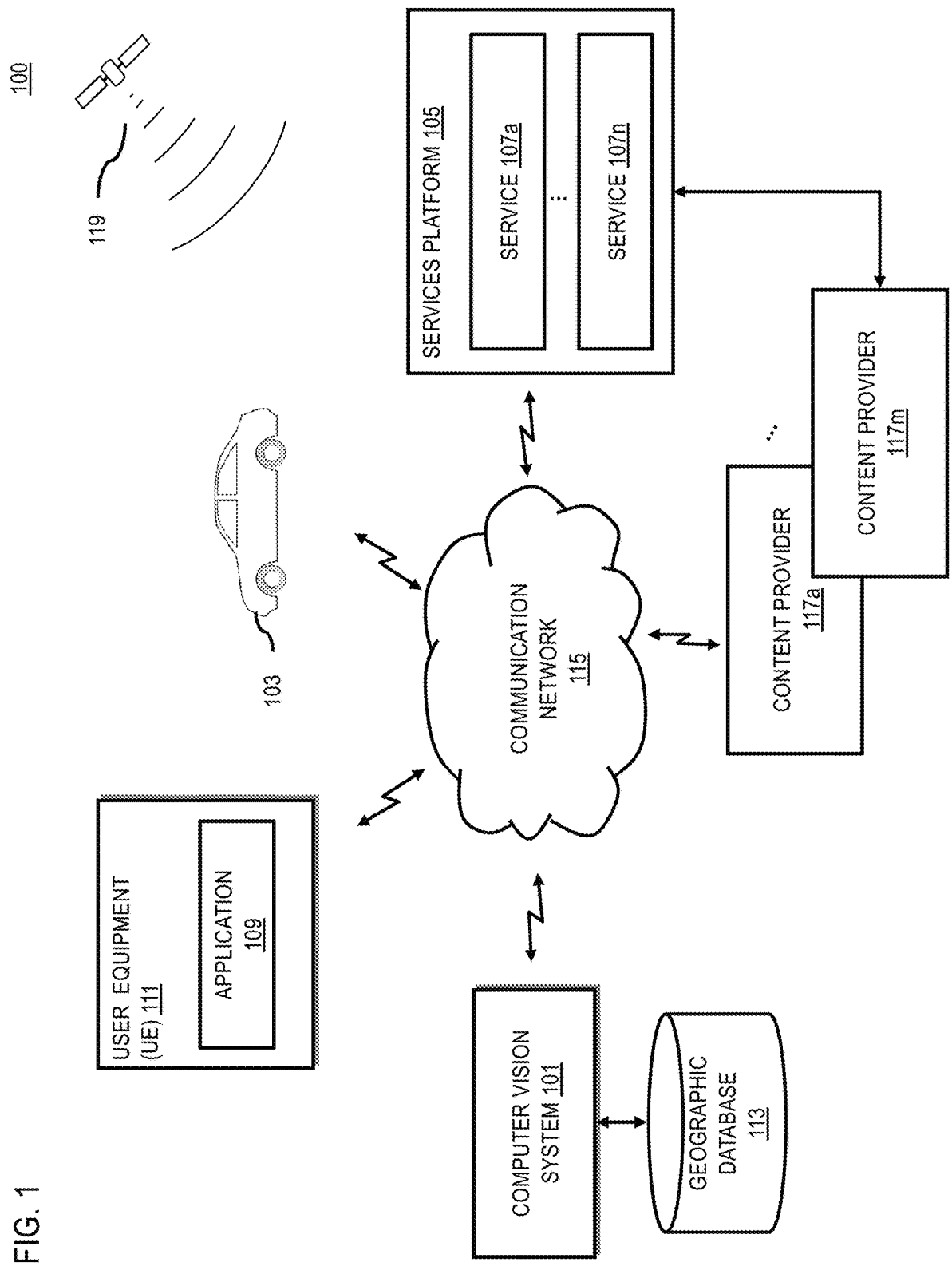
FIG. 1 is a diagram of a system capable of constructing a polyline from line segments, according to one embodiment.

FIG. 1 is a diagram of a system capable of constructing a polyline from line segments, according to one embodiment. As discussed above, a computer vision system 101 can use image analysis to detect objects from image data. For example, edges have proved to be very useful in image analysis for various applications. These applications include but are not limited to: (1) autonomous driving where lane edges and road boundaries are detected and used for navigation and localization (e.g., navigation and localization of a vehicle 103); (2) scene understanding and object boundary detection; and (3) representing blood vessels, nerves, brain structures, heart structures, etc. in biomedical image processing.

Generally, edges in an image indicate a change in the image intensity that arise as a result of depth discontinuities, illumination changes, color changes, etc. detected by image analysis. In one embodiment, edges of objects can be represented as curvilinear features (e.g., straight and/or curved line segments) in edge detection. In some situations, edges could be detected as broken line segments for any number of reasons including not limited to noise in the edge detector (e.g., detector used by the computer vision system 101), low quality image data, etc. As used herein, broken line segments refer to multiple discrete line segments that in actuality should represent one continuous edge. In other situations, representing a continuous edge or object using multiple broken line segments can be by design where a long curvilinear edge is represented as a part-based edge segment model.

However, representing an edge using broken line segments can make it much more complicated to understand the edges or provide a coherent model of the edge to support various applications. For example, given discrete broken line segments, the computer vision system 101 would not know whether those line segments represent individual edges or one edge. If such edges are lane lines or road boundaries that are used for vehicle localization, the computer vision system 101 or other component of the system 100 may have to spend additional computer resources localizing against multiple edges instead of one edge, thereby potentially increasing processing time, memory usage, processor usage, bandwidth usage, etc.

To address these technical challenges, the system 100 of FIG. 1 introduces a capability to construct a polyline representation of a detected edge or object from a set of line segments (e.g., line segments generated by traditional computer vision image analysis). A polyline, for instance, is a continuous line composed of one or more sub-lines delineated by the vertices of the sub-lines. In one embodiment, given a set of line of segments, the system 100 selects a candidate line segment (e.g., selects randomly or using any other selection criteria or method). The system 100 then finds the best neighboring line segment and merges the neighboring line segment with the candidate. In one embodiment, the system 100 determines whether a neighboring line segment is the "best" by determining whether the candidate line segment and the neighboring line segment are mutually closest to each other, and/or whether the distance meets a system-defined criterion (e.g., distance between the line segments is less than a maximum threshold distance). In one embodiment, the system 100 can then iteratively repeat this process until no neighboring candidate line segments remain in the set or satisfy the criteria for merging (e.g., mutual closeness, distance threshold, etc.).

Although the embodiment described herein can be applied to various use cases, one example use case is for vehicle localization and autonomous driving. It is noted that autonomous driving is provided by way of illustration and not as a limitation. Autonomous driving has quickly become an area of intense interest, with recent advances in machine learning, computer vision and compute power enabling real-time mapping and sensing of a vehicle's environment. Such an understanding of the environment enables autonomous, semi-autonomous, or highly assisted driving in a vehicle (e.g., a vehicle 103) in at least two distinct ways.

First, real-time sensing of the environment provides information about potential obstacles, the behavior of others on the road, and safe, drivable areas. An understanding of where other cars are and what they might do is critical for a vehicle 103 to safely plan a route. Moreover, vehicles 103 generally must avoid both static (lamp posts, e.g.) and dynamic (cats, deer, e.g.) obstacles, and these obstacles may change or appear in real-time. More fundamentally, vehicles 103 can use a semantic understanding of what areas around them are navigable and safe for driving. Even in a situation where the world is completely mapped in high resolution, exceptions will occur in which a vehicle 103 might need to drive off the road to avoid a collision, or where a road's geometry or other map attributes like direction of travel have changed. In this case, detailed mapping may be unavailable, and the vehicle 103 has to navigate using real-time sensing of road features or obstacles using a computer vision system (e.g., the computer vision system 101).

A second application of vision techniques in autonomous driving is localization of the vehicle 103 with respect to a map of reference landmarks. Understanding one's location on a map enables planning of a route, both on fine and coarse scales. On a coarse scale, navigation maps allow vehicles 103 to know what roads to use to reach a particular destination. However, on a finer scale, maps allow vehicles 103 to know what lanes to be in and when to make lane changes. Knowing this information is important for planning an efficient and safe route, for in complicated driving situations maneuvers need to be executed in a timely fashion, and sometimes before they are visually obvious. In addition, localization with respect to a map enables the incorporation of other real-time information into route planning. Such information could include traffic, areas with unsafe driving conditions (ice, fog, potholes, e.g.), and temporary road changes like construction.

With respect to lane localization and also generally with respect to autonomous driving, high accuracy and real-time localization of vehicles 103 is needed. Traditionally, most vehicle navigation systems have performed this localization using GPS or other traditional location sensors, which generally provide a real-time location with a 95% confidence interval of 7.8 meters. However, in complicated urban environments, reflection of GPS signals can further increase this error, such that one's location may be off by as much as 30 meters. Given that the width of many lanes is 3-4 meters, this accuracy is not sufficient to properly localize a vehicle 103 (e.g., an autonomous vehicle) so that it can make safe route planning decisions. Other sensors, such as inertial measurement units (IMUs) can increase the accuracy of localization by taking into account vehicle movement, but these sensors tend to drift and still do not provide sufficient accuracy for localization.

Figure 2:
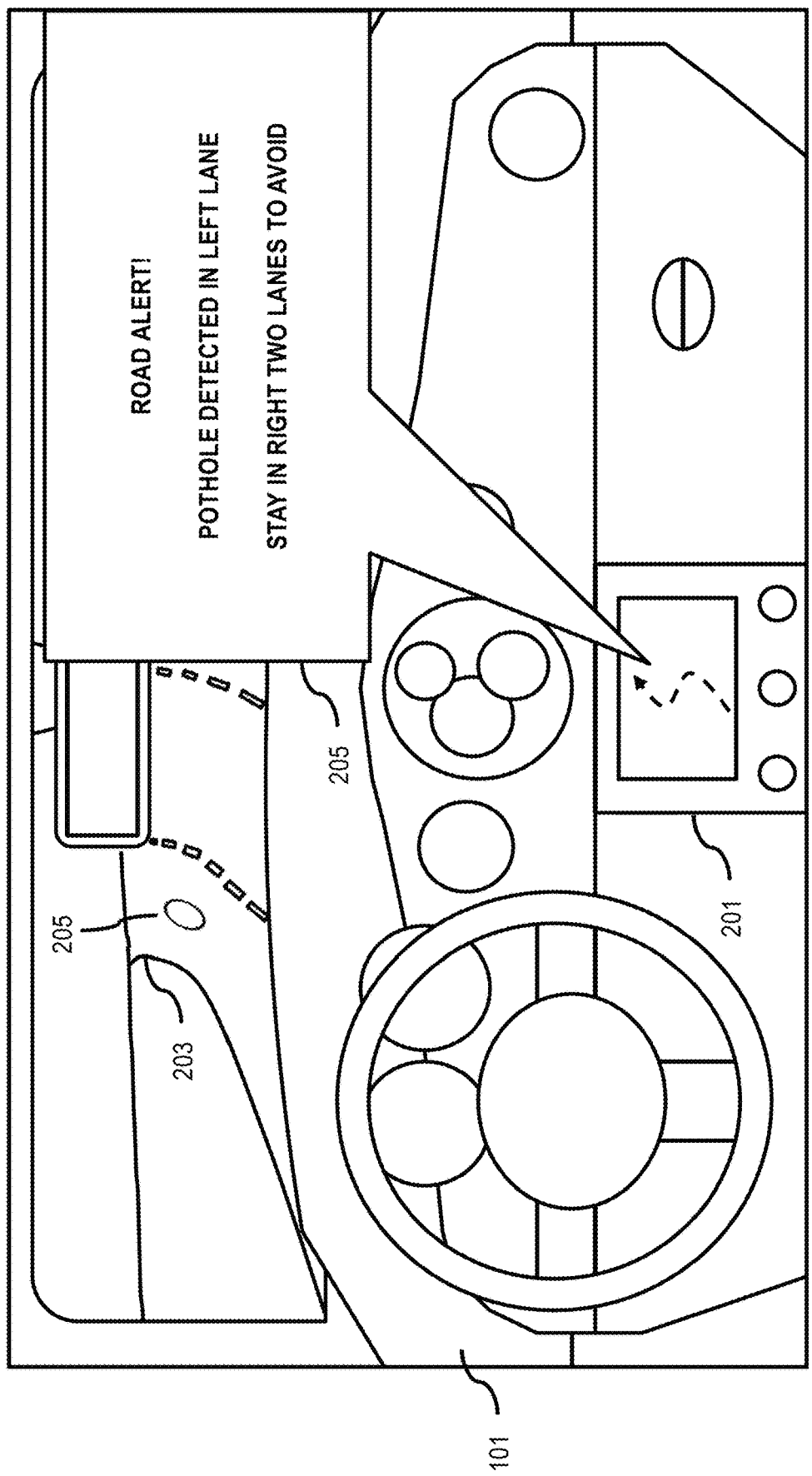
FIG. 2 is diagram illustrating example vehicle navigation system that can employ localization based on lane lines, according to one embodiment.

In general, a localization accuracy of around 10 cm is needed for safe driving in many areas. One way to achieve this level of accuracy is to use visual odometry, in which features are detected from imagery. These features can then be matched to a database of features to determine one's location. For example, FIG. 2 illustrates a vehicle 103 equipped with a navigation or autonomous vehicle control system 201 that employs an embodiment of the computer vision system 101 as described herein. In this example, a pothole 205 has been detected or otherwise reported in the left lane of the roadway 203. The navigation or vehicle control system 201 can use lane localization to detect which lane of the roadway 203 the vehicle 103 is currently driving in (e.g., currently driving in the right lane). By employing visual odometry, the lane detection can be performed with sufficient accuracy to enable the system 201 to instruct the driver to remain in the detected right lane to avoid the pothole 205 in the left lane. In autonomous mode, the system 201 can operate the vehicle 103 so that it remains in the right lane until the pothole 205 is passed.

Traditional feature-based localization that both detect features and localize against them generally rely on low-level features. However, low-level features typically used in these algorithms (e.g., Scale-Invariant Feature Transform (SIFT) or Oriented FAST and rotated BRIEF (ORB)) tend to be brittle and not persist in different environmental and lighting conditions. As a result, they often cannot be used to localize a vehicle on different days in different weather conditions. Aside from reproducibility, the ability to detect and store higher level features of different types can provide better and more accurate localization with higher confidence.

In response to these issues, the system 100 of FIG. 1 (e.g., including the computer vision system 101) focuses on high level features that have semantic meaning for human beings. One such feature that is important to autonomous driving is the detection of lane markings and corresponding lane models. Lane-level information is important for self-driving applications because it defines the grammar of driving. Without knowledge of lane markings, it can difficult or impossible to determine where a vehicle 103 should drive, can drive, and what maneuvers are possible. As a result, the ability to detect lane-lines in real-time constitutes a fundamental part for the design of an autonomous vehicle 103.

One technique that has shown significant ability to detect lanes is the use of convolutional neural networks. Neural networks have shown unprecedented ability to recognize objects in images, understand the semantic meaning of images, and segment images according to these semantic categories. Despite the successful use of neural networks to detect lane markings and create lane models, a fundamental problem remains. Neural network-based lane detectors must compromise between flexibility of representation and semantic understanding of the lane geometry. For example, the segmented nature of neural networks typically can result in broken line representations or part-based segmented representations of a continuous edge such as lane markings or road boundaries. As discussed above, representing such road features using broken or non-continuous line segments can make it more difficult for the system 100 to model and understand that the individual line segments produced from image analysis are part of the same lane marking, road boundary, or other road feature.

Figure 3A:
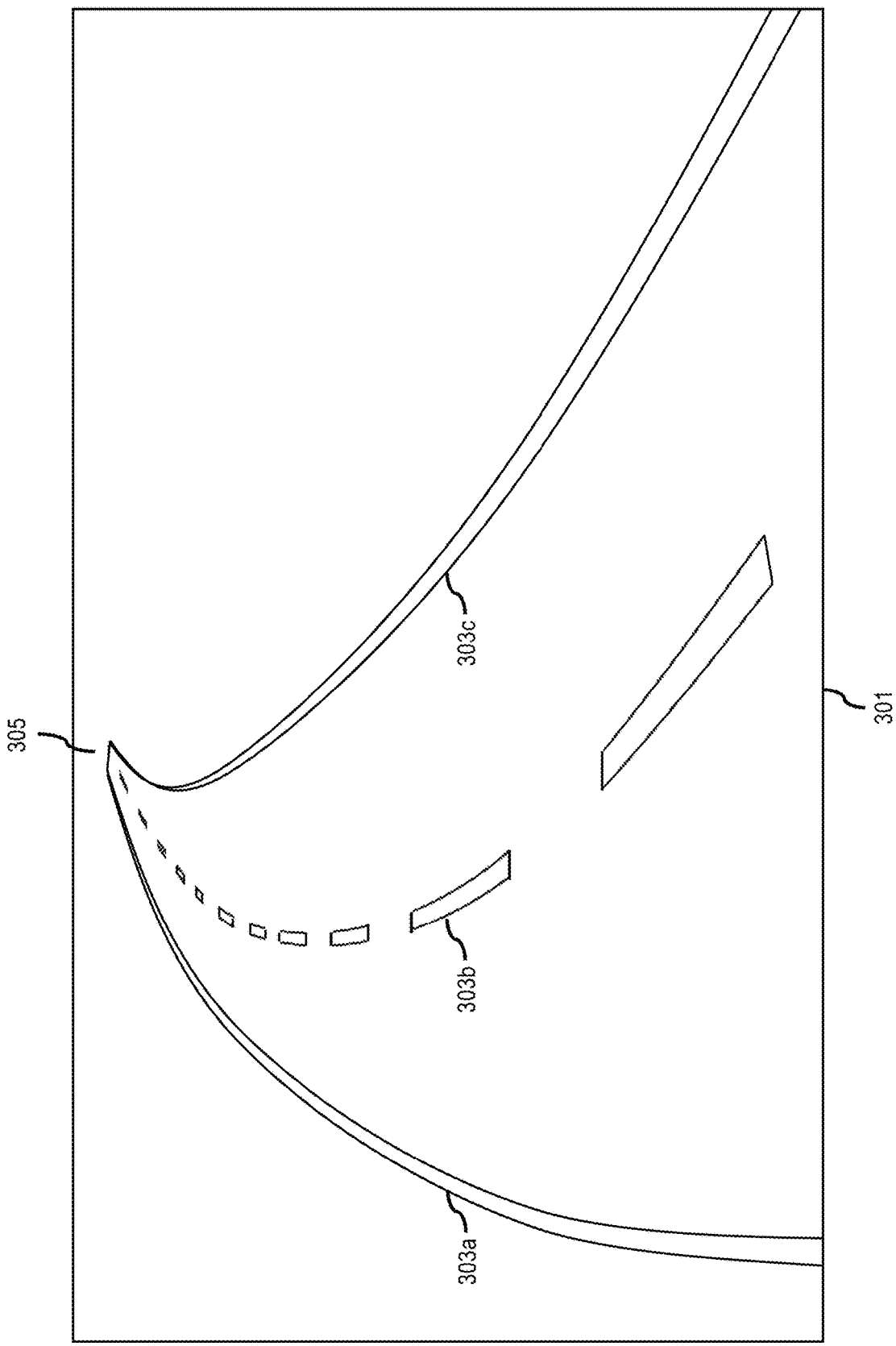
FIG. 3A is a diagram of an input image of lane lines captured by a vehicle camera system, according to one embodiment.

FIG. 3A is a diagram of an example input image 301 depicting lane lines 303a-303c captured by a vehicle camera system, according to one embodiment. In this example, the image 301 is captured in real-time by a camera system of a vehicle 103 as raster images at a predetermined pixel resolution. In one embodiment, the image 301 can be captured using cameras sensitive to visible light, infra-red, and/or any other wavelength of light. To support real-time operation, the image 301 can be part of an image stream captured at a relatively high frequency (e.g., 20 Hz, 30 Hz, or higher). Each frame of the image stream can then be processed to provide real-time detection of lane-lines.

Figure 3B:
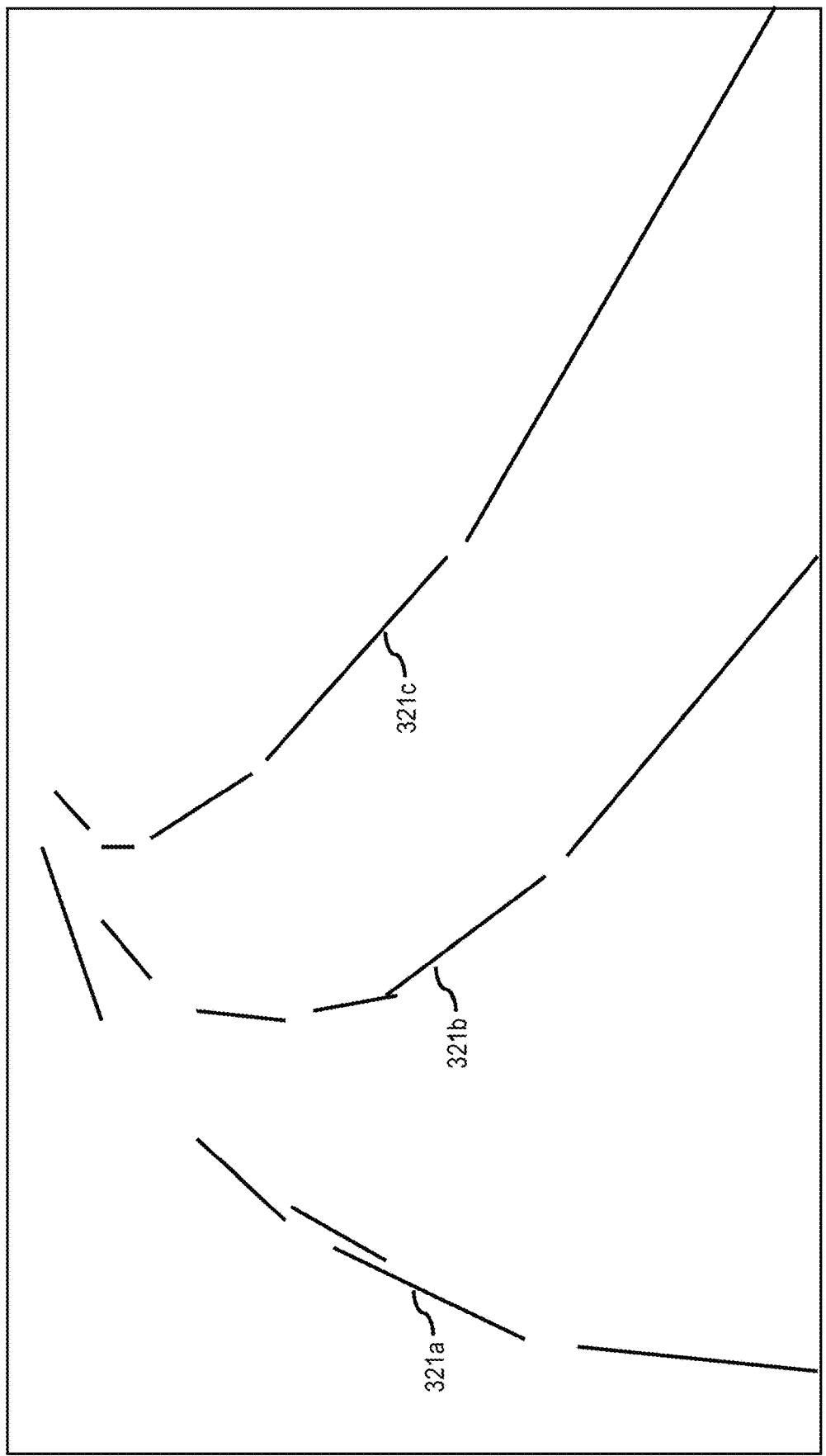
FIG. 3B is a diagram of line segments output by a computer vision system to represent lane lines of the input image of FIG. 3A, according to one embodiment.

FIG. 3B is a diagram of line segments output by the computer vision system 101 to represent lane lines 303a-303c of the input image 301 of FIG. 3A, according to one embodiment. The computer vision system 101 performs a real-time image analysis of the input image 301 to generate respective sets 321a-321c of line segments for each of the lane lines 303a-303c. As shown, the line segments are broken line segments with multiple line segments corresponding to each lane line 303a-303c. In one embodiment, the computer vision system 101 can use attributes of the line segments to cluster candidate line segments into each of the respect sets 321a-321c before merging them to construct polylines. For example, the attributes can include location, color, style, etc. In one embodiment, as shown in FIG. 3C, the computer vision system 101 can process the line segment sets 321a-321c of FIG. 3B to construct respective polylines 341a-341c to represent each of the lane lines 303a-303c.

Figure 4:
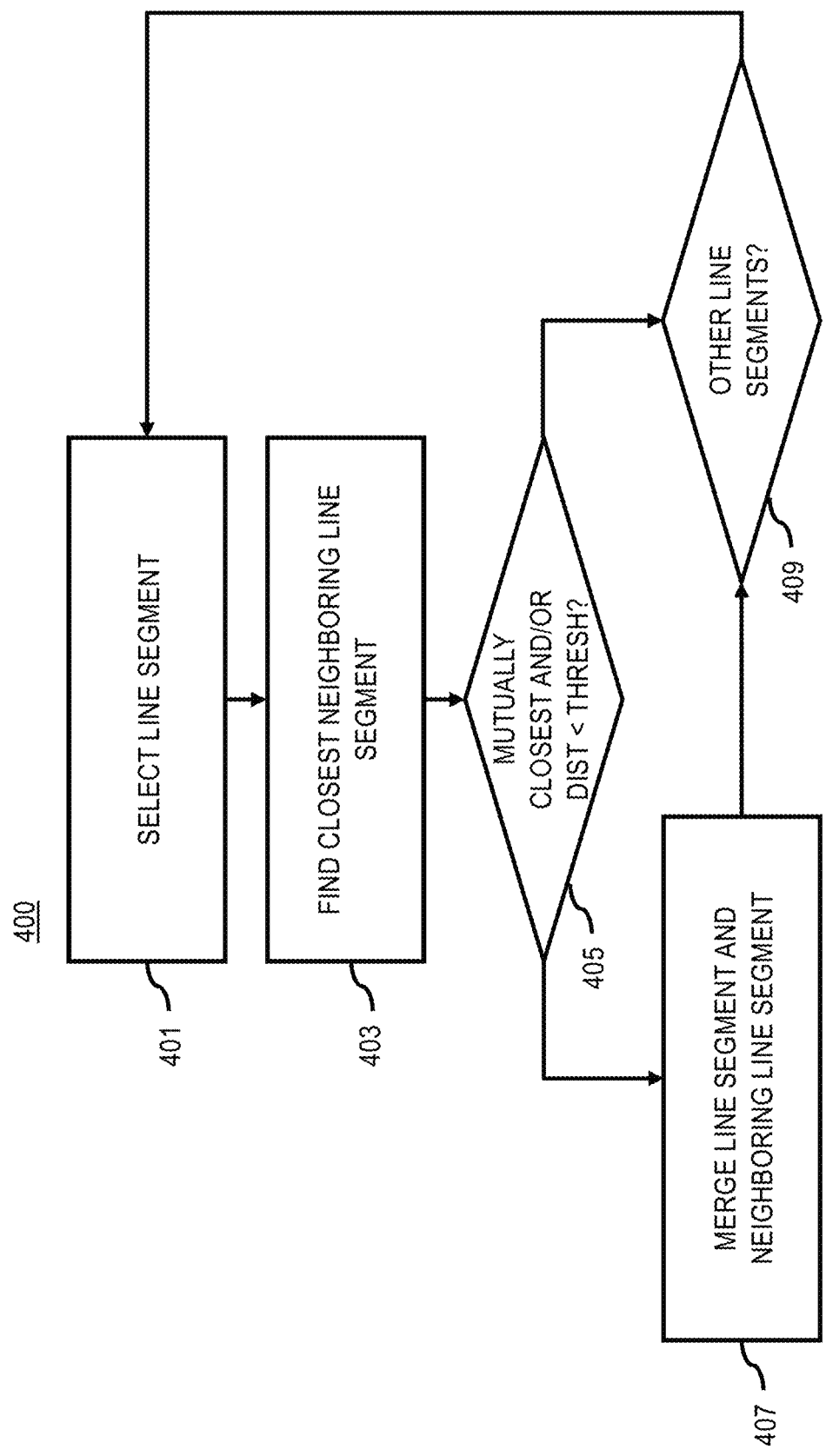
FIG. 4 is a flowchart of a process for constructing a polyline from line segments, according to one embodiment.
Figure 8:
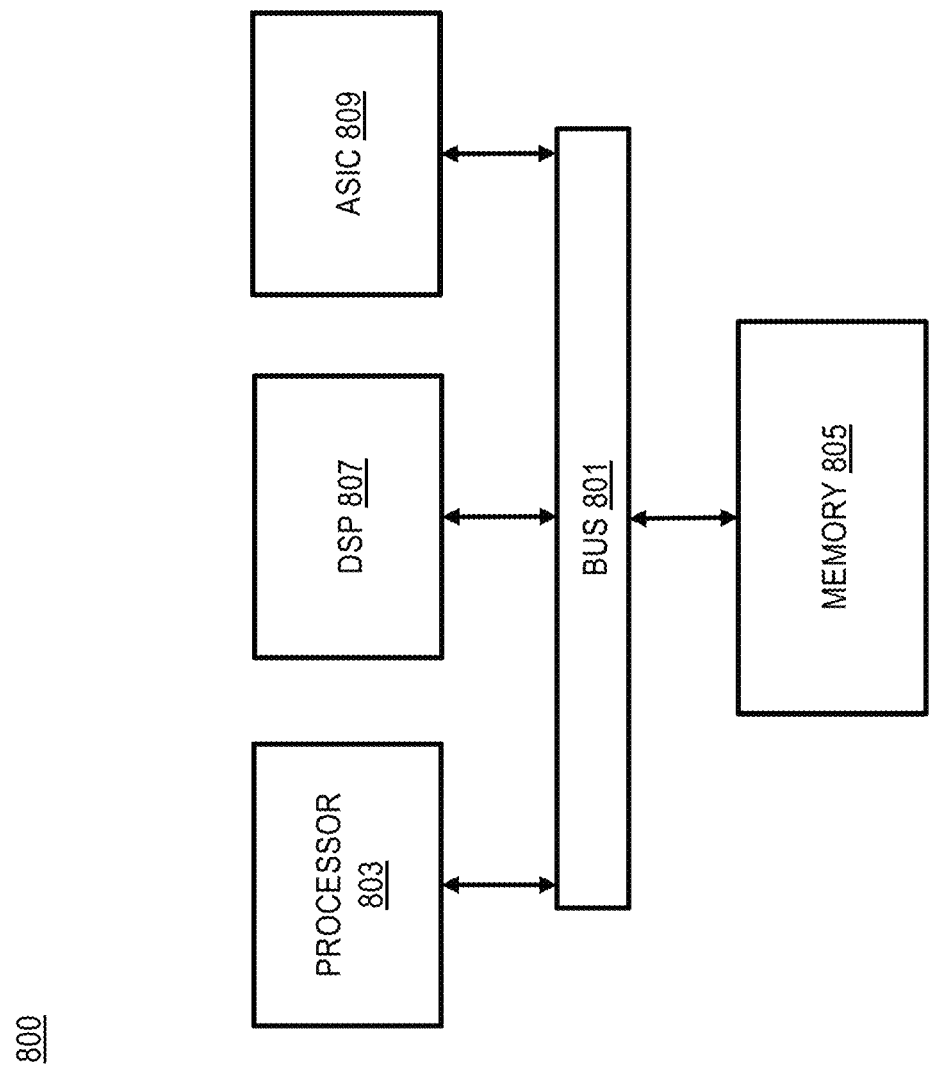
FIG. 8 is a diagram of a chip set that can be used to implement an embodiment.

FIG. 4 is a flowchart that provides additional details of the process for constructing a polyline from line segments, according to one embodiment. In one embodiment, the computer vision system 101 may perform one or more portions of the process 400 and may be implemented in, for instance, a chip set including a processor and a memory as shown in FIG. 8. As such, the computer vision system 101 can provide means for accomplishing various parts of the process 400. In addition or alternatively, a services platform 105 and/or any of the services 107a-107n (also collectively referred to as services 107) may perform any combination of the steps of the process 400 in combination with the computer vision system 101 or as standalone components. In yet another embodiment, an application 109 executing on a user equipment (UE) device 111 and/or the vehicle 103 can perform one or more portions of the process 400 alone or in combination with the computer vision system 101. Although the process 400 is illustrated and described as a sequence of steps, it is contemplated that various embodiments of the process 400 may be performed in any order or combination and need not include all of the illustrated steps.

In step 401, the computer vision system 101 selects one candidate line segment from a plurality of line segments (e.g., set of candidate line segments). The plurality of line segments, for instance, represents a plurality of object edges detected from image data by the computer vision system 101 or equivalent system. In one embodiment, the line segments can be generated using any other process based on the specific application. For example, in biomedical image processing, the line segments can represent biological structures (e.g., blood vessels, nerves, organs, etc.) detected from analysis of medical imaging data (e.g., X-rays, Magnetic Resonance Imaging (MRI), Positron Emission Tomography (PET) scans, etc.). In other applications, the line segments can represent edges of objects detected for any other purpose such as general scene understanding, object boundary detection, facial recognition, etc. In one embodiment, the computer vision system 100 can select the candidate line segment randomly or use any other selection criteria, rule, process, etc.

In step 403, the computer vision system 101 finds a closest neighboring line segment. In other words, the computer vision system 101 determines a neighboring line segment from among the plurality of line segments. The neighboring line segment is determined based on having a closest distance to the line segment from among the plurality of line segments. In one embodiment, the computer vision system 101 can the distance function described below or any other equivalent distance function to determine a "closeness" of the candidate line segment with its neighboring line segment. An example of a distance is provided below by way of illustration and not as a limitation:

$$\text{Distance} = \frac{1}{2} * (\text{Distance}(L_A, L_B) + \text{Distance}(L_B, L_A))$$

where, Distance $(L_A, L_B) = \lambda *$ lateral distance $(L_A, L_B) + (1-\lambda) *$ longitudinal distance $(L_A, L_B)$, and where $L_A$ (e.g., candidate line segment) and $L_B$ (e.g., neighboring line segment) are line segments, and $\lambda$ is an optional factor that weights whether the calculated distance favors the lateral distance over longitudinal distance and vice versa. For example, if $\lambda$ is 0 the calculated distance is based on just the longitudinal distance, and if $\lambda$ is 1 the calculated distance is based on just the lateral distance. In this way, the computer vision system 101 remains capable of merging line segments in situation where longitudinal distance is large but lateral distance is small, and vice versa.

In one embodiment, lateral distance $(L_A, L_B)$ and longitudinal distance $(L_A, L_B)$ are computed as described below. The computer vision system 101 finds the closer end point $P_A$ of line segment $L_A$ to line segment $L_B$, and closer end point $P_B$ of line segment $L_B$ to line segment $L_A$. Lateral distance $(L_A, L_B)$ is then defined as the perpendicular distance of the point $P_A$ to the line segment $L_B$. In other words, the computer vision system 101 selects a line segment endpoint of the candidate line segment that is closest to the neighboring line segment, and then calculates a lateral distance between the line segment and the neighboring line segment as a perpendicular distance of the line segment endpoint to the neighboring line segment.

In one embodiment, longitudinal distance $(L_A, L_B)$ is defined as the distance from the projection point of $P_A$ on $L_B$ to point $P_B$. In other words, the computer vision system 101 selects a neighboring line segment endpoint of the neighboring line segment that is closest to the candidate line segment, and then calculates a longitudinal distance between the line segment and the neighboring line segment as a distance from a projection point of the line segment endpoint on the neighboring line segment to the neighboring line segment endpoint. The closest distance can then be calculated based on the lateral distance and/or longitudinal distance. By way of example, the smaller the calculated distance, the closer the two line segments are as determined by the computer vision system 101.

In one embodiment, the computer vision system 101 then determines whether the calculated distance indicate that candidate line segment and its neighboring line segment are mutually the closest or "best" neighbors of each other to determine whether to merge the line segments into one polyline (step 405). This recognizes the potential that the even if the neighboring line segment is the closest neighbor to the candidate line segment from the perspective of the candidate line segment, the candidate line segment is not necessarily the closest neighbor of the neighboring line segment. This can occur when there is, for instance, a third line segment farther away from the candidate line segment, but is closer in distance to the determined neighboring line segment than the neighboring line segment is from the candidate line segment.

In addition or alternatively, the computer vision system 101 can also determine whether the calculated distance between the candidate line segment and its neighboring line segment (i.e., the mutual closest distance) is less than a maximum threshold distance to decide on whether to merge the two line segments. For example, if there is a large gap between two line segments, it can become less probable that the two line segments are part of the same continuous edge. Thus, the computer vision system 101 can avoid merging any two line segments that are too far apart.

If the mutual closeness and/or distance threshold criteria are, the computer vision system 101 merges the candidate line segment and its neighboring line segment (step 407). In other words, the computer vision system 101 merges the line segment and the neighboring line segment into a polyline based on determining that the closest distance is a mutual closest distance between line segment and the neighboring line and/or based on determining that the mutual closest distance is less than the distance threshold.

In one embodiment, the computer vision system 101 can use any process to merge the two line segments into a polyline. For example, the merging can be based on whether there is any overlap between the two line segments. In one embodiment, the merging comprises connecting the line segment and the neighboring line segment using a line (e.g., a straight line, a curved line, etc.) based on determining that the line segment and the neighboring line segment do not overlap. The merging comprises averaging an overlapping portion of the line segment and the neighboring line segment based on determining that the line segment and the neighboring line segment overlap.

In step 409, the computer vision system 101 can then iteratively evaluate each subsequent neighboring line segment from the set of candidate line segments to add to the polyline until there are no other candidate line segments left or no other candidate line segments meet the criteria described above for merging.

Figure 5A:
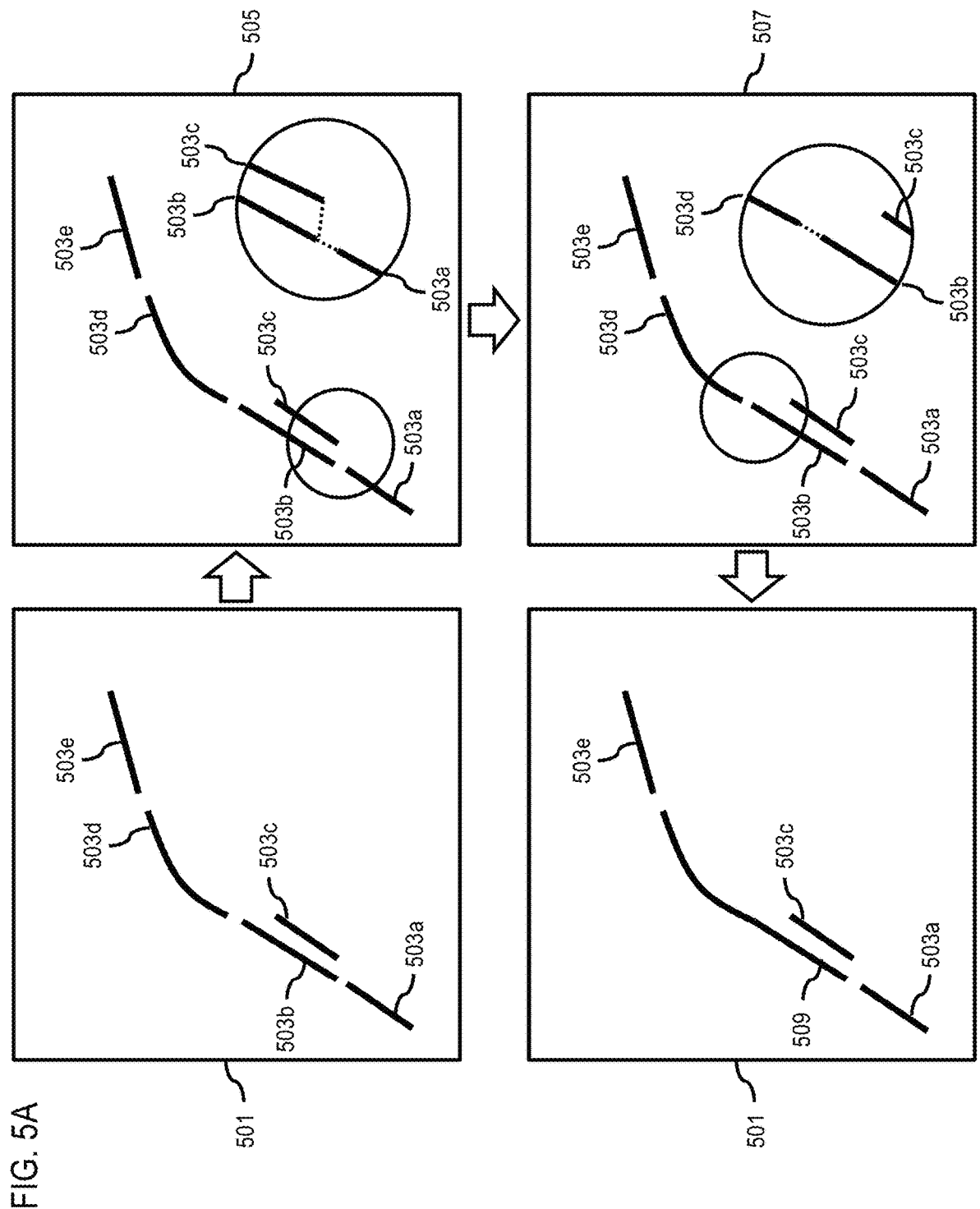
FIGS. 5A and 5B are diagrams illustrating an example use case for constructing a polyline from line segments, according to one embodiment.
Figure 5B:
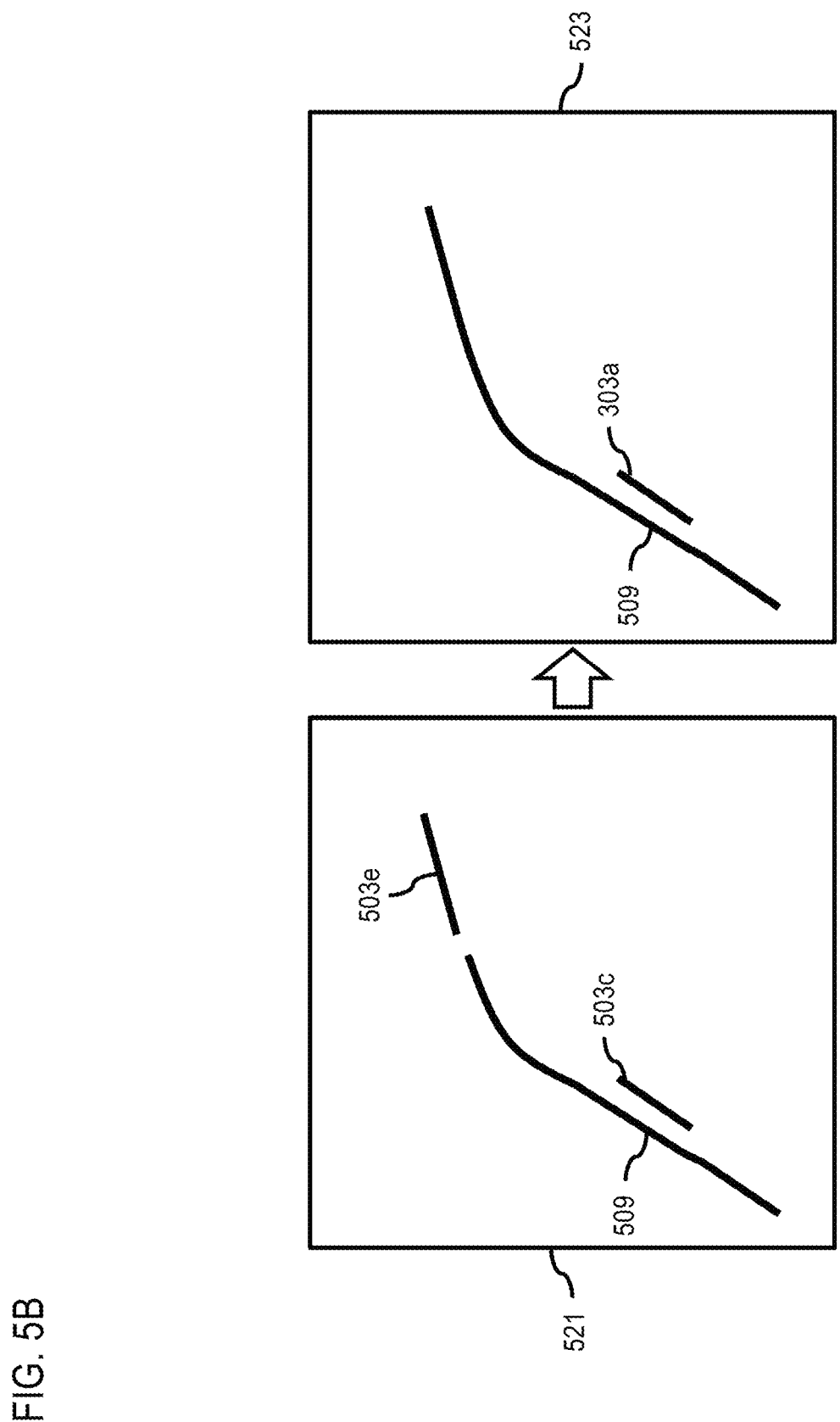
Figure 6:
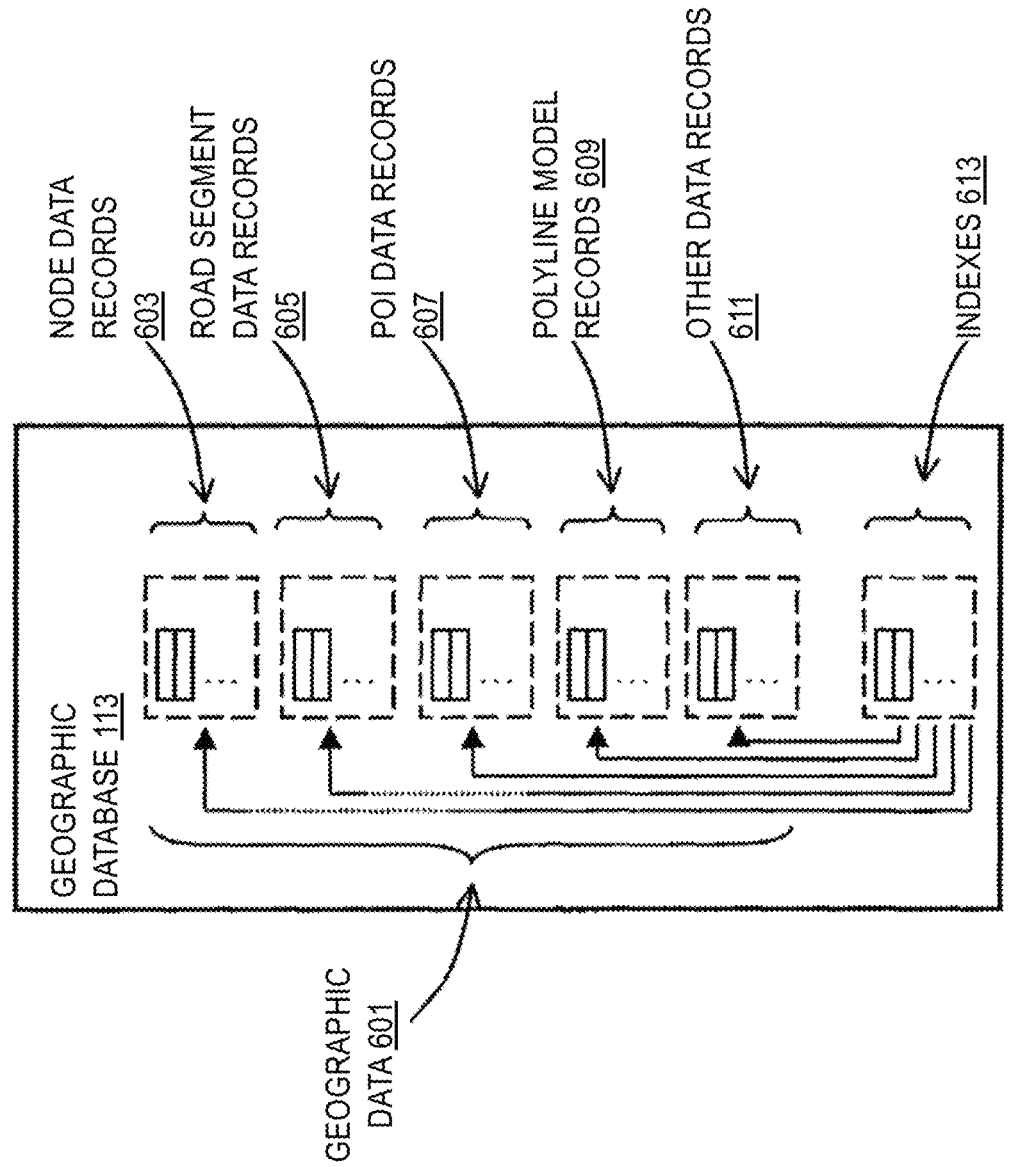
FIG. 6 is a diagram of a geographic database, according to one embodiment.

FIGS. 5A and 5B are diagrams illustrating an example use case for constructing a polyline from line segments, according to one embodiment. As shown in FIG. 5A, box 501 includes a set of line segments 503a-503e that are to be processed for merging according to the embodiments described herein. In box 505, the computer vision system 101 randomly selects candidate line segment 503c to begin the merging process. Neighboring line segment 503b is the closest neighbor to the candidate line segment 503c, but the neighboring line segment 503b's closest neighbor is line segment 503a. Accordingly, the computer vision system 101 determines that candidate line segment 503c and the neighboring line segment 503b are not mutually each other's closest neighbor and does not merge them together.

Because there no other neighboring line segments that can be merged with the candidate line segment 503c (e.g., no neighboring line segment meeting merging criteria), the computer vision system 101 randomly selects another candidate line segment from among the remaining candidates. In this example, the computer vision system 101 selects candidate line segment 503d. As shown in box 507, the computer vision system 101 determines that neighboring line segment 503b is the closest neighbor to the candidate segment 503d that meets the merging criteria. Accordingly, the candidate line segment 503d and the neighboring line segment 503b are merged into a polyline 509 as shown in box 511.

The computer vision system 101 then continues to the merging process until the remaining line segments 503a and 503e are processed. For example, as shown in box 521 of FIG. 5B, line segment 503a is the closest neighbor to the polyline 509 and meets the merging criteria. Therefore, the line segment 503a is merged into the polyline 509, leaving only line segment 503e. As shown in box 523, the line segment 503e and the polyline 509 meet merging criteria, and therefore line segment 503e is merged into the polyline 509. At end of the merging process, the original set of five candidate line segments 503a-503e is reduced to a continuous polyline 509 (e.g., comprising line segments 503a, 503b, 503d, and 503e) and an unmerged line segment 503c as the final output.

Returning to FIG. 1, as shown, the system 100 includes a computer vision system 101 configured to perform the functions associated with generating and/or decoding the parametric representations of lane lines detected in an input image according to the various embodiments described herein. In one embodiment, the computer vision system 101 includes a neural network or other machine learning/parallel processing system to automatically detect features such as lane lines or other objects in image data. In one embodiment, the neural network of the computer vision system 101 is a traditional convolutional neural network which consists of multiple layers of collections of one or more neurons (e.g., processing nodes of the neural network) which are configured to process a portion of an input image. In one embodiment, the receptive fields of these collections of neurons (e.g., a receptive layer) can be configured to correspond to the area of an input image delineated by a respective a grid cell generated as described above.

In one embodiment, the computer vision system 101 also has connectivity or access to a geographic database 113 which stores representations of mapped geographic features to facilitate video odometry to increase localization accuracy. The geographic database 113 can also store polyline representations of lane lines and other similar features/objects and/or related data generated according to the various embodiments described herein.

In one embodiment, the computer vision system 101 has connectivity over a communication network 115 to a services platform 105 that provides one or more services 107. By way of example, the services 107 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 107 uses the output of the computer vision system 101 (e.g., polyline object models) for various applications including but not limited to localizing the vehicle 103 or a user equipment 111 (e.g., a portable navigation device, smartphone, portable computer, tablet, etc.) to provide services 107 such as POI recommendations, advertising intelligence, etc.

In one embodiment, the computer vision system 101 may be a platform with multiple interconnected components. The computer vision system 101 may include multiple servers, intelligent networking devices, computing devices, components and corresponding software for providing parametric representations of lane lines. In addition, it is noted that the computer vision system 101 may be a separate entity of the system 100, a part of the one or more services 107, a part of the services platform 105, or included within the UE 111 and/or vehicle 103.

In one embodiment, content providers 117a-117m (collectively referred to as content providers 117) may provide content or data (e.g., including geographic data, parametric representations of mapped features, etc.) to the geographic database 113, the computer vision system 101, the services platform 105, the services 107, the UE 111, the vehicle 103, and/or an application 109 executing on the UE 111. The content provided may be any type of content, such as map content, textual content, audio content, video content, image content, etc. In one embodiment, the content providers 117 may provide content that may aid in the detecting and classifying of lane lines and/or other features in image data. In one embodiment, the content providers 117 may also store content associated with the geographic database 113, computer vision system 101, services platform 105, services 107, UE 111, and/or vehicle 103. In another embodiment, the content providers 117 may manage access to a central repository of data, and offer a consistent, standard interface to data, such as a repository of probe data, speed limit for one or more road links, speed information for at least one vehicle, traffic jam threshold for at least one road link, other traffic information, etc. Any known or still developing methods, techniques or processes for retrieving and/or accessing features for road links from one or more sources may be employed by the computer vision system 101.

In one embodiment, the UE 111 and/or vehicle 103 may execute a software application 109 to collect, encode, and/or decode objects or features detected in image data into polyline representations according the embodiments described herein. By way of example, the application 109 may also be any type of application that is executable on the UE 111 and/or vehicle 103, such as autonomous driving applications, mapping applications, location-based service applications, navigation applications, content provisioning services, camera/imaging application, media player applications, social networking applications, calendar applications, and the like. In one embodiment, the application 109 may act as a client for the computer vision system 101 and perform one or more functions of the computer vision system 101 alone or in combination with the system 101.

By way of example, the UE 111 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 111 can support any type of interface to the user (such as "wearable" circuitry, etc.). In one embodiment, the UE 111 may be associated with the vehicle 103 or be a component part of the vehicle 103.

In one embodiment, the UE 111 and/or vehicle 103 are configured with various sensors for generating or collecting environmental image data (e.g., for processing the computer vision system 101), related geographic data, etc. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the UE 111 and/or vehicle 103 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 111 and/or vehicle 103 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 111 and/or vehicle 103 may include GPS or other satellite-based receivers to obtain geographic coordinates from satellites 119 for determining current location and time. Further, the location can be determined by a triangulation system such as A-GPS, Cell of Origin, or other location extrapolation technologies.

In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 115 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the geographic database 113, computer vision system 101, services platform 105, services 107, UE 111, vehicle 103, and/or content providers 117 communicate with each other and other components of the system 100 using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

FIG. 11 is a diagram of a geographic database, according to one embodiment. In one embodiment, the geographic database 113 includes geographic data 601 used for (or configured to be compiled to be used for) mapping and/or navigation-related services, such as for video odometry based on the parametric representation of lanes include, e.g., encoding and/or decoding parametric representations into lane lines. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three dimensional polygon extrusions. Accordingly, the terms polygons and polygon extrusions as used herein can be used interchangeably.

In one embodiment, the following terminology applies to the representation of geographic features in the geographic database 113.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 113 follows certain conventions. For example, links do not cross themselves and do not cross each other except at a node. Also, there are no duplicated shape points, nodes, or links. Two links that connect each other have a common node. In the geographic database 113, overlapping geographic features are represented by overlapping polygons. When polygons overlap, the boundary of one polygon crosses the boundary of the other polygon. In the geographic database 113, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 113 includes node data records 603, road segment or link data records 605, POI data records 607, polyline model records 609, other records 611, and indexes 1113, for example. More, fewer or different data records can be provided. In one embodiment, additional data records (not shown) can include cartographic ("carto") data records, routing data, and maneuver data. In one embodiment, the indexes 1113 may improve the speed of data retrieval operations in the geographic database 113. In one embodiment, the indexes 1113 may be used to quickly locate data without having to search every row in the geographic database 113 every time it is accessed. For example, in one embodiment, the indexes 1113 can be a spatial index of the polygon points associated with stored feature polygons.

In exemplary embodiments, the road segment data records 605 are links or segments representing roads, streets, or paths, as can be used in the calculated route or recorded route information for determination of one or more personalized routes. The node data records 603 are end points corresponding to the respective links or segments of the road segment data records 605. The road link data records 605 and the node data records 603 represent a road network, such as used by vehicles, cars, and/or other entities. Alternatively, the geographic database 113 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 113 can include data about the POIs and their respective locations in the POI data records 607. The geographic database 113 can also include data about places, such as cities, towns, or other communities, and other geographic features, such as bodies of water, mountain ranges, etc. Such place or feature data can be part of the POI data records 307 or can be associated with POIs or POI data records 607 (such as a data point used for displaying or representing a position of a city).

In one embodiment, the geographic database 113 can also include polyline model records 609 for storing polyline representations constructed from recognized line segments (e.g., line segments representing object edges or other features) according to the various embodiments described herein. In one embodiment, the polyline model records 609 can be associated with one or more of the node records 603, road segment records 605, and/or POI data records 607 to support localization or video odometry based on the features stored therein and the generated parametric representations of lane lines of the records 609. In this way, the polyline model records 609 can also be associated with the characteristics or metadata of the corresponding record 603, 605, and/or 607.

In one embodiment, the geographic database 113 can be maintained by the content provider 117 in association with the services platform 105 (e.g., a map developer). The map developer can collect geographic data to generate and enhance the geographic database 113. There can be different ways used by the map developer to collect data. These ways can include obtaining data from other sources, such as municipalities or respective geographic authorities. In addition, the map developer can employ field personnel to travel by vehicle (e.g., vehicle 103 and/or UE 111) along roads throughout the geographic region to observe features and/or record information about them, for example. Also, remote sensing, such as aerial or satellite photography, can be used.

The geographic database 113 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 103 or UE 111. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for constructing a polyline from line segments may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
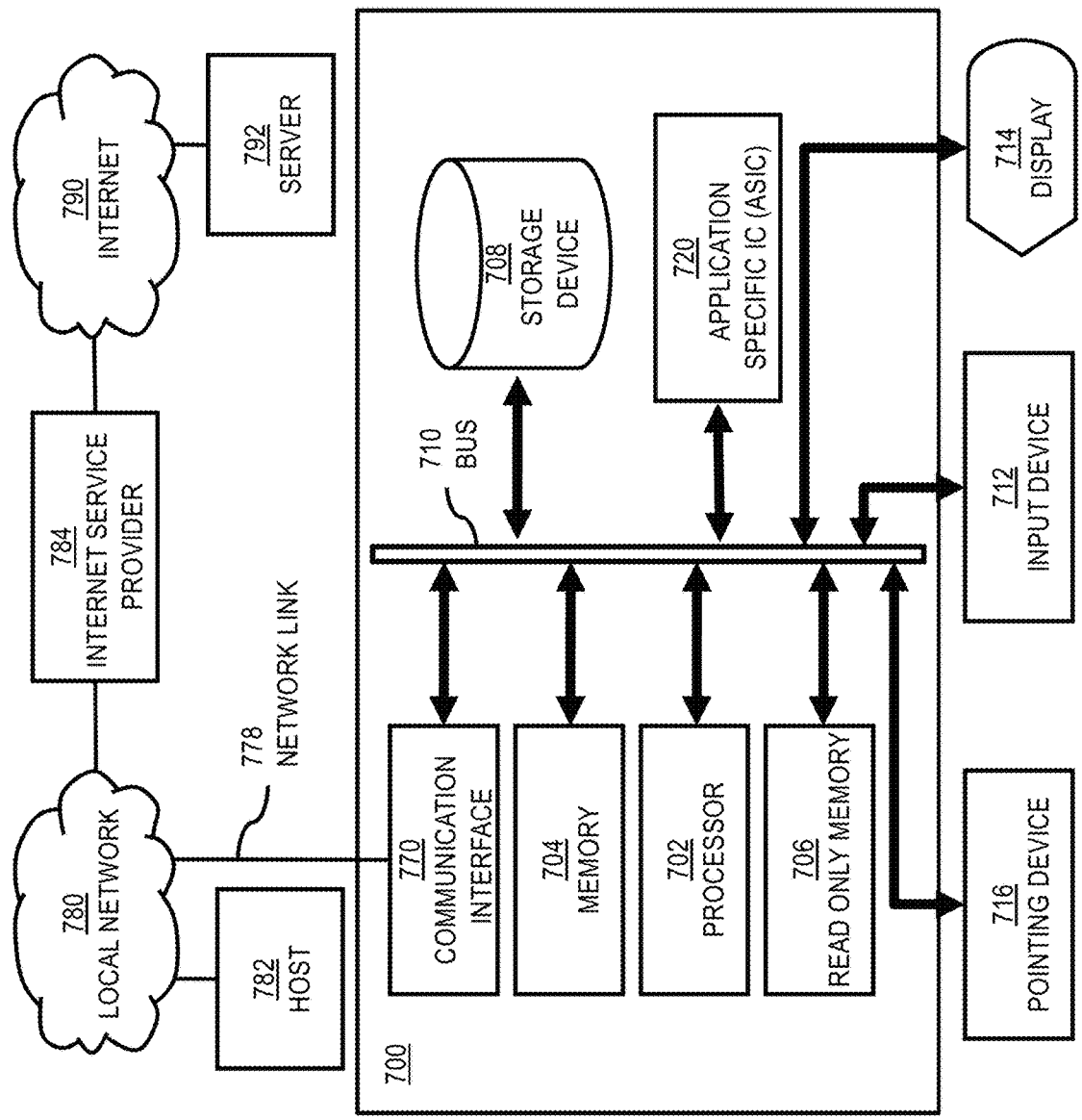
FIG. 7 is a diagram of hardware that can be used to implement an embodiment.

FIG. 7 illustrates a computer system 700 upon which an embodiment of the invention may be implemented. Computer system 700 is programmed (e.g., via computer program code or instructions) to construct a polyline from line segments as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to constructing a polyline from line segments. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for constructing a polyline from line segments. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for constructing a polyline from line segments, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 115 for constructing a polyline from line segments.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 8 illustrates a chip set 800 upon which an embodiment of the invention may be implemented. Chip set 800 is programmed to construct a polyline from line segments as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to construct a polyline from line segments. The memory 805 also stores the data associated with or generated by the execution of the inventive steps.

Figure 9:
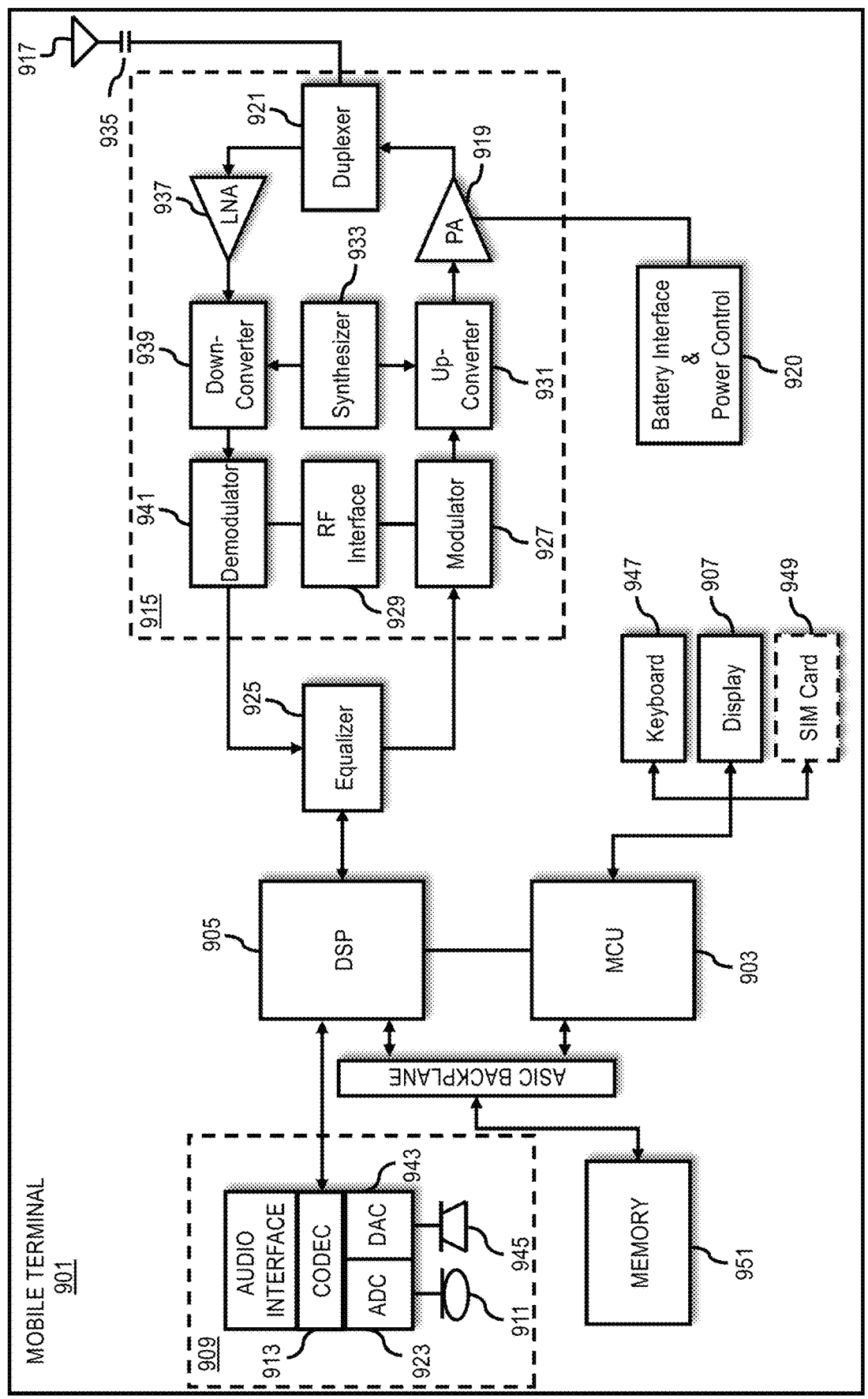
FIG. 9 is a diagram of a mobile terminal (e.g., handset) that can be used to implement an embodiment.

FIG. 9 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions that offer automatic contact matching. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile station 901 to construct a polyline from line segments. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 951 may be, but not limited to, a single memory, CD, DVD, ROM, RAM, EEPROM, optical storage, or any other non-volatile or non-transitory storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
selecting, by a processor, a line segment from a plurality of line segments;
determining a neighboring line segment from among the plurality of line segments, the neighboring line segment having a closest distance to the line segment from among the plurality of line segments; and
merging the line segment and the neighboring line segment into a polyline based on determining that the closest distance is a mutual closest distance between the line segment and the neighboring line segment, wherein the polyline embodies one or more attributes of the line segment and the neighboring line segment.

2. The method of claim 1, wherein the plurality of line segments represents a plurality of object edges detected from image data by a computer vision system.

3. The method of claim 1, further comprising:
selecting a line segment endpoint of the line segment that is closest to the neighboring line segment; and
calculating a lateral distance between the line segment and the neighboring line segment as a perpendicular distance of the line segment endpoint to the neighboring line segment,
wherein the closest distance is calculated based on the lateral distance.

4. The method of claim 3, further comprising:
selecting a neighboring line segment endpoint of the neighboring line segment that is closest to the line segment; and
calculating a longitudinal distance between the line segment and the neighboring line segment as a distance from a projection point of the line segment endpoint on the neighboring line segment to the neighboring line segment endpoint,
wherein the closest distance is calculated based on the lateral distance, the longitudinal distance, or a combination thereof.

5. The method of claim 1, wherein the merging comprises connecting the line segment and the neighboring line segment using a line based on determining that the line segment and the neighboring line segment do not overlap.

6. The method of claim 1, wherein the merging comprises averaging an overlapping portion of the line segment and the neighboring line segment based on determining that the line segment and the neighboring line segment overlap.

7. The method of claim 1, wherein the merging is further based on determining that the mutual closest distance is less than a threshold distance.

8. The method of claim 1, further comprising:
iteratively processing one or more other line segments of the plurality of line segments to determine whether to merge the one or more other line segments into the polyline.

9. The method of claim 1, wherein the polyline represents a road feature used for providing navigation guidance to a user device.

10. The method of claim 1, wherein the plurality of line segments is acquired from a single image frame.

11. The method of claim 1, wherein merging the line segment and the neighboring line segment into a polyline comprises connecting the line segment to the neighboring line segment.

12. The method of claim 1, wherein the line segment and the neighboring line segment have different directions.

13. An apparatus comprising:
at least one processor; and
at least one memory including computer program code for one or more programs,
the at least one memory and the computer program code configured to, with the at least one processor, cause the apparatus to perform at least the following,
select a line segment from a plurality of line segments;
determine a neighboring line segment from among the plurality of line segments, the neighboring line segment having a closest distance to the line segment from among the plurality of line segments; and
merge the line segment and the neighboring line segment into a polyline based on determining that the closest distance is a mutual closest distance between the line segment and the neighboring line segment, wherein the polyline embodies one or more attributes of the line segment and the neighboring line segment.

14. The apparatus of claim 13, wherein the plurality of line segments represents a plurality of object edges detected from image data by a computer vision system.

15. The apparatus of claim 13, wherein the apparatus is further caused to:
select a line segment endpoint of the line segment that is closest to the neighboring line segment, and a neighboring line segment endpoint of the neighboring line segment that is closest to the line segment;
calculate a lateral distance between the line segment and the neighboring line segment as a perpendicular distance of the line segment endpoint to the neighboring line segment; and
calculate a longitudinal distance between the line segment and the neighboring line segment as a distance from a projection point of the line segment endpoint on the neighboring line segment to the neighboring line segment endpoint,
wherein the closest distance is calculated based on the lateral distance, the longitudinal distance, or a combination thereof.

16. The apparatus of claim 13, wherein the merging comprises connecting the line segment and the neighboring line segment using a line based on determining that the line segment and the neighboring line segment do not overlap, and wherein the merging comprises averaging an overlapping portion of the line segment and the neighboring line segment based on determining that the line segment and the neighboring line segment overlap.

17. The apparatus of claim 13, wherein the merging is further based on determining that the mutual closest distance is less than a threshold distance.

18. The apparatus of claim 13, wherein the apparatus is further caused to:
iteratively process one or more other line segments of the plurality of line segments to determine whether to merge the one or more other line segments into the polyline.

19. The apparatus of claim 13, wherein the plurality of line segments is acquired from a single image frame.

20. The apparatus of claim 13, wherein merge the line segment and the neighboring line segment into a polyline comprises connect the line segment to the neighboring line segment.

21. A non-transitory computer-readable storage medium, carrying one or more sequences of one or more instructions which, when executed by one or more processors, cause an apparatus to perform:
selecting a line segment from a plurality of line segments;
determining a neighboring line segment from among the plurality of line segments, the neighboring line segment having a closest distance to the line segment from among the plurality of line segments; and
merging the line segment and the neighboring line segment into a polyline based on determining that the closest distance is a mutual closest distance between the line segment and the neighboring line segment, wherein the polyline embodies one or more attributes of the line segment and the neighboring line segment.

22. The non-transitory computer-readable storage medium of claim 21, wherein the plurality of line segments represents a plurality of object edges detected from image data by a computer vision system.

23. The non-transitory computer-readable storage medium of claim 21, wherein the apparatus is caused to further perform:
   selecting a line segment endpoint of the line segment that is closest to the neighboring line segment, and a neighboring line segment endpoint of the neighboring line segment that is closest to the line segment;
   calculating a lateral distance between the line segment and the neighboring line segment as a perpendicular distance of the line segment endpoint to the neighboring line segment; and
   calculating a longitudinal distance between the line segment and the neighboring line segment as a distance from a projection point of the line segment endpoint on the neighboring line segment to the neighboring line segment endpoint,
   wherein the closest distance is calculated based on the lateral distance, the longitudinal distance, or a combination thereof.

24. The non-transitory computer-readable storage medium of claim 21, wherein the merging comprises connecting the line segment and the neighboring line segment using a line based on determining that the line segment and the neighboring line segment do not overlap, and wherein the merging comprises averaging an overlapping portion of the line segment and the neighboring line segment based on determining that the line segment and the neighboring line segment overlap.

25. The non-transitory computer-readable storage medium of claim 21, wherein the merging is further based on determining that the mutual closest distance is less than a threshold distance.

26. The non-transitory computer-readable storage medium of claim 21, wherein the plurality of line segments is acquired from a single image frame.

27. The non-transitory computer-readable storage medium of claim 21, wherein merging the line segment and the neighboring line segment into a polyline comprises connecting the line segment to the neighboring line segment.

* * * * *